United States Patent
Soerensen

(10) Patent No.: US 12,196,185 B2
(45) Date of Patent: Jan. 14, 2025

(54) ELECTROLYTIC UNIT HOUSING WITH PRESSURE-RELIEF AREA

(71) Applicant: Siemens Gamesa Renewable Energy A/S, Brande (DK)

(72) Inventor: Johnny Soerensen, Videbaek (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/107,891

(22) Filed: Feb. 9, 2023

(65) Prior Publication Data

US 2023/0265833 A1 Aug. 24, 2023

(30) Foreign Application Priority Data

Feb. 18, 2022 (EP) ..................... 22157520

(51) Int. Cl.
*F03D 9/19* (2016.01)
*F03D 80/80* (2016.01)

(52) U.S. Cl.
CPC ............... *F03D 9/19* (2016.05); *F03D 80/80* (2016.05); *F05B 2220/61* (2013.01); *F05B 2220/706* (2013.01)

(58) Field of Classification Search
CPC ........ F03D 9/19; F03D 80/80; F05B 2220/61; F05B 2220/706
See application file for complete search history.

(56) References Cited

U.S. PATENT DOCUMENTS

| | | | |
|---|---|---|---|
| 5,592,028 A | 1/1997 | Pritchard | |
| 2013/0026139 A1* | 1/2013 | Becker | F03D 13/20 |
| | | | 218/157 |
| 2013/0058070 A1* | 3/2013 | Gaard | H01F 27/321 |
| | | | 361/836 |
| 2014/0102885 A1 | 4/2014 | Devine | |
| 2016/0006066 A1* | 1/2016 | Robertson | C25B 15/08 |
| | | | 429/417 |
| 2021/0156038 A1 | 5/2021 | Ballantine et al. | |
| 2021/0404439 A1* | 12/2021 | Kinsella | C25B 15/085 |

FOREIGN PATENT DOCUMENTS

| | | |
|---|---|---|
| CN | 215628320 U | 1/2022 |
| WO | WO 2020095012 A1 | 5/2020 |
| WO | WO 2021098929 A1 | 5/2021 |

* cited by examiner

*Primary Examiner* — Viet P Nguyen
(74) *Attorney, Agent, or Firm* — Schmeiser, Olsen & Watts LLP

(57) ABSTRACT

A wind turbine includes a generator, a base, a nacelle, a tower having a first end mounted to the base and a second end supporting the nacelle, and an electrolytic unit electrically powered by the generator to produce hydrogen from an input fluid, in particular water, wherein the electrolytic unit is electrically coupled to the generator by an electric connection, wherein the electrolytic unit is housed in a housing, wherein the housing includes a pressure-relief section configured to detach from the housing in the event of an explosion inside the housing or when the pressure inside the housing exceeds a predetermined pressure.

20 Claims, 6 Drawing Sheets

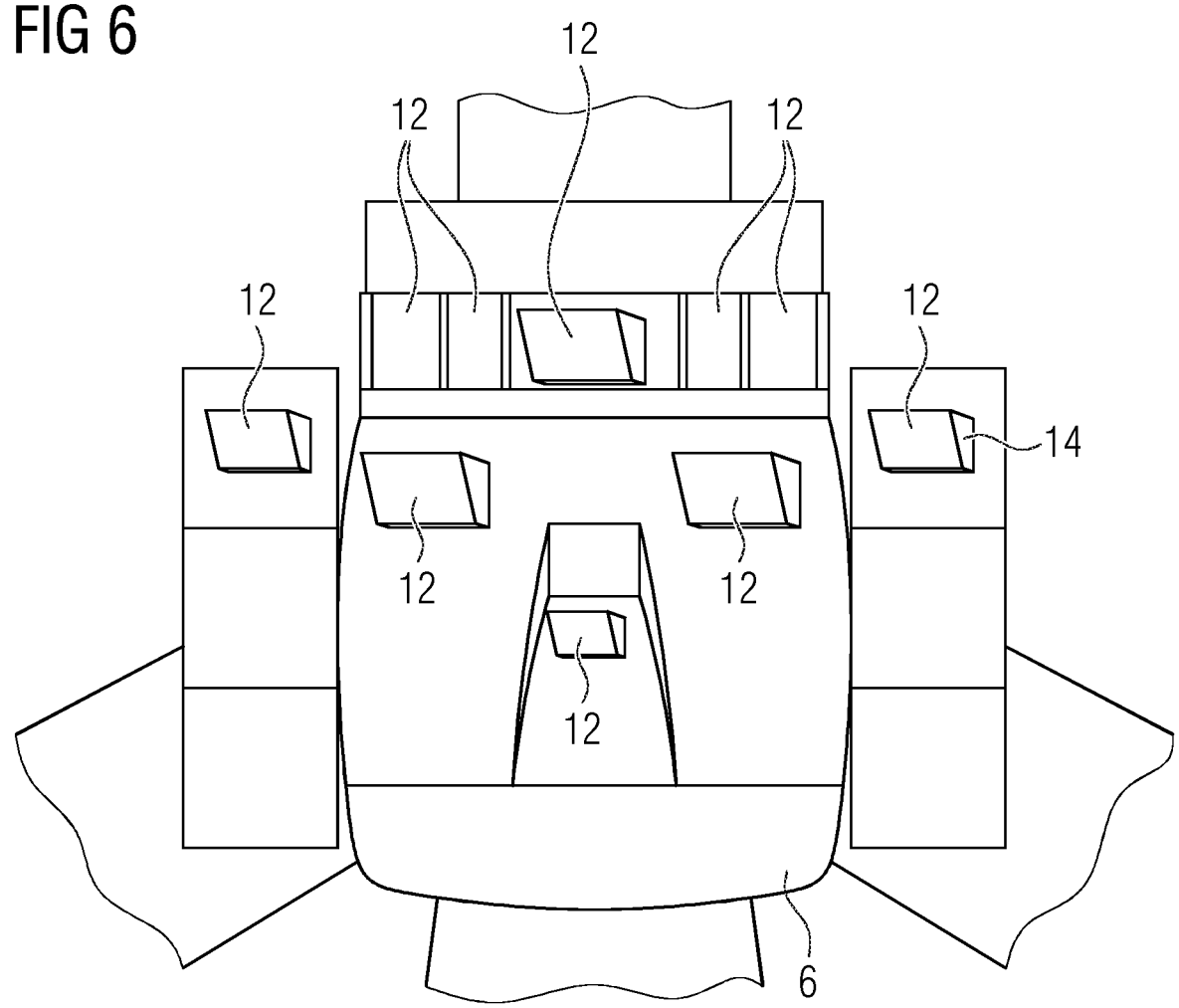

ELECTROLYTIC UNIT HOUSING WITH PRESSURE-RELIEF AREA

CROSS-REFERENCE TO RELATED APPLICATIONS

This application claims priority to EP Application No. 22157520.2, having a filing date of Feb. 18, 2022, the entire contents of which are hereby incorporated by reference.

FIELD OF TECHNOLOGY

The following relates to a wind turbine comprising a pressure-relief section. The following further relates to a method of relieving the pressure of an explosion in a housing of an electrolytic unit of said wind turbine.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

Wind turbines are placed at locations providing high wind amounts. These locations can be remote onshore locations or offshore locations on the sea. For the transportation of the electrical energy, the power generated by the generator of the wind turbine travels to a transmission substation of the wind farm, where it is converted to high voltage, usually between 130-765 kV, for long distance transmission on the transmission grid over power lines. The transmission grid connects the remote location of the wind farm to a transformer station of the electrical grid, which transforms the electricity to a voltage compatible with the electrical grid.

A problem of remote wind farms is that the distance between the wind farm and the transformer station of the electrical grid needs to be bridged. Long power lines with very high installation costs are required.

The current development of the technology of wind turbines tends to an increased size of wind turbines for harvesting more wind energy, with longer blades and higher towers. Due to the increasing size of wind turbines, more power is supplied to the grid which is to be transported from the wind farm to the nearest input point of the grid. Increasing the power transferred over the long-distance power lines results in higher requirements for the cables and higher costs.

To reduce the amount of energy transferred by the power lines of the transmission grid or to avoid the use of long-distance power lines completely, an electrolytic unit can be installed in the vicinity of the wind turbine. A wind turbine comprising an electrolytic unit generates electrical power by means of the generator and hydrogen by means of the electrolytic unit driven by at least a part of the power of the wind turbine.

Electrolytic units are power-to-gas units configured to produce hydrogen. Hence, the energy produced by the wind turbine may be used in an electrolysis process to generate hydrogen and oxygen. These gases can be used afterwards for the generation of electrical energy in fuel cells or to produce chemicals, such as ammonia or methane. The produced gases from the electrolytic unit can be transported by using a pipeline or by pressurizing the gas into a container, which is less expensive than transporting electricity directly over long-distance power lines.

The use of electrolytic units in combination with wind turbines is known from the conventional art, for example in the document U.S. Pat. No. 5,592,028 A, where a plurality of electrolysis cells are connected to a wind farm and produce hydrogen by means of the electricity produced by the generators of the wind turbines. Similarly, the document WO 2020/095012 A1 describes an offshore wind turbine system for the large-scale production of hydrogen, which includes a floating tower structure with a desalination unit and an electrolysis unit.

The electrolytic unit of a wind turbine is usually housed in a housing to protect the electrolytic unit from the environmental conditions such as rain or from the sea water and wind due to the high corrosive effect on the electrolytic unit components.

In a wind turbine with an electrolytic unit housed in a housing, hydrogen might leak and build up inside the housing, thereby increasing the risk of an explosion. An explosion is caused when for example a spark of an electric component ignites the leaked hydrogen, which results in a rapid expansion in volume associated with an extremely vigorous outward release of energy. As the high-pressure gas is contained in the housing, the released energy is built up and contained until the moment when it breaks the housing and is released instantly to the environment in the form of an explosion. The explosion splinters the housing and results in the splitters splinters being projected in all directions as projectiles. This can seriously injure workers at the wind turbine, as well as damage crucial wind turbine components which cannot be replaced with ease, such as the blades, the tower or the nacelle.

SUMMARY

An aspect relates to provide a wind turbine with safety measures so that in case of an explosion, the risk of injures to workers and damage to crucial components of the wind turbine are mitigated.

According to embodiments of the invention, a wind turbine comprises a generator, a base, a nacelle, a tower having a first end mounted to the base and a second end supporting the nacelle, and an electrolytic unit electrically powered by the generator to produce hydrogen from an input fluid, in particular water, wherein the electrolytic unit is electrically coupled to the generator by means of an electric connection, wherein the electrolytic unit is housed in a housing.

Hence, the generator generates electric power and supplies the electrolytic unit with at least a part of the power generated, as both components are electrically coupled.

Due to the fluctuation of the power generation, depending for example on weather conditions and wind levels, it is difficult to foresee the power output of a wind turbine to the electricity grid or to an energy storage device. By using a part of the energy produced by the generator to produce hydrogen, the fluctuations can be mitigated. The hydrogen can be taken out of the wind turbine by a system outlet coupled to an output of the electrolytic unit.

Hence, at least a part of the energy produced by the generator can be used to power an electrolytic unit, so that the electricity grid is not overloaded by peaks of power generation of the fluctuating power generation facility. Additionally, if a problem in the output to the electricity grid occurs, the power can be redirected completely to the electrolytic unit so that only hydrogen, is produced. The hydrogen produced is usually in a gaseous state, which can be compressed and/or mixed with other components to a liquid state which is easier to store and/or transport.

The electrolytic unit can also be a mixed gas generator which performs electrolysis and generates other gases. For example, the electrolytic unit can perform electrolysis on water and carbon dioxide to generate a mixed gas made of hydrogen and carbon monoxide. Alternatively, hydrogen can be mixed with natural gas, which increases the hydrogen/carbon ratio of the hydrogen and gives it a flame speed up to eight times higher than compressed natural gas.

According to embodiments of the invention, the wind turbine further comprises a pressure-relief section configured to detach from the housing in the event of an explosion inside the housing or when the pressure inside the housing exceeds a predetermined pressure.

The pressure-relief section instantly relieves the pressure inside the housing to prevent the housing breaking up as a result of the explosion. After the explosion, the damaged components of the electrolytic unit can be replaced, and the pressure-relief section can be closed again or replaced without having to replace other parts of the wind turbine due to the prevention of pressure build up which causes a bigger explosion in the housing.

Hence, the pressure-relief section provides a safety measure which ensures that, in the case of an explosion, the pressure inside the housing does not build up in such a way that the housing breaks and splinters in all directions.

The pressure-relief section can be understood as a weak section compared to the rest of the housing, through which the pressure is released when the pressure inside the housing exceeds a predetermined pressure.

The predetermined pressure is a pressure at which the event of an explosion inside the housing can be determined and at the same time a pressure which can be borne by the sections of the housing which are not the pressure-relief section without breaking. Hence, at the predetermined pressure, the pressure-relief section of the housing breaks and the pressure inside the housing is relieved, while the rest of the housing remains intact. The pressure can be measured by sensors and a pressure of for example 2 bar can be chosen as the predetermined pressure.

By means of embodiments of the invention, an uncontrolled explosion and the resulting blasts and shockwaves are avoided by releasing the pressure immediately after the first blast.

Hence, embodiments of the present invention increases the safety of the wind turbine by reducing the damages caused by an explosion.

According to an embodiment of the invention, the wind turbine further comprises an electrolytic unit platform supporting at least a part of the electrolytic unit above the water level.

With the dedicated electrolytic unit platform, the electrolytic unit can be more easily mounted than for example by installing the electrolytic unit on the nacelle and at least a part of the electrolytic unit can be kept above the water level.

According to another embodiment of the invention, the housing of the electrolytic unit is a container. Due to the harsh environmental conditions of wind turbine locations, the components of the electrolytic unit are exposed to rain and dirt, as well as to salt for offshore wind turbines installed at the sea. This results in a fast corrosion of the metals of the components. In order to prevent corrosion, components of the wind turbine installed comprising metallic parts exposed to the atmosphere, such as an electrolytic unit installed on an electrolytic unit platform of the wind turbine, are usually housed in containers.

According to another embodiment of the invention, the pressure-relief section is located in the radially outer region of the housing in relation to the tower's longitudinal axis.

Hence, the weak section of the housing is chosen at the radially outer region of the housing to ensure that the explosion is guided in a direction away from the tower or any components between the tower and the housing, as well as any workers which might be on the electrolytic unit platform on which the electrolytic unit is arranged. The explosion will thus be guided towards the outside of the electrolytic unit platform, and not towards the inner part where the tower is.

According to another embodiment of the invention, the pressure-relief section is located on top of the housing. The pressure-relief section can be an upwardly facing wall or a panel on the top wall of the housing so that the blast pressure will be directed upwardly in the event of an explosion. This reduces the danger to bystanders.

According to another embodiment of the invention, the pressure-relief section is located at a side wall of the container. The pressure-relief section can comprise hinges to avoid the complete release of the pressure-relief section and injure nearby people or wind turbine components.

According to another embodiment of the invention, the housing further comprises a releasable retainer for holding the pressure-relief area attached to the housing, the releasable retainer comprising pressure-sensitive means configured to release the retainer in the event of an explosion or when the pressure inside the housing exceeds the predetermined pressure.

In the event of an explosion, which results in a pressure above the predetermined pressure for detaching the pressure-relief section, the pressure-relief section is released and the pressure in the housing is relieved.

The releasable retainer can be made of a sheet of material holding the pressure-relief section, wherein the sheet of material is automatically removed in the event of an explosion by the pressure resulting from the explosion.

The sheet of material holding the pressure-relief section can be placed between the pressure-relief section and the rest of the housing so as to separate both parts of the housing.

The sheet of material holding the pressure-relief section can also be placed on an edge of the pressure-relief section. The sheet of material can be pivotally connected to the edge so that, in the event of an explosion, the movement of the sheet of material will release the pressure-relief section.

The releasable retainer can also be electrically opened in the case an explosion is detected.

According to another embodiment of the invention, the releasable retainer is configured to be held in the housing by gravity. The weight of the pressure-relief section retains the pressure-relief section at the housing.

According to another embodiment of the invention, the releasable retainer is glued to the housing. Through the pressure rise and the heat of the explosion, the glue weakens, and the pressure-relief section can be released.

According to another embodiment of the invention, the releasable retainer is a hinge. A hinge allows the rotation of the pressure-relief section in case of a pressure rise and the opening of the pressure-relief section without completely detaching the pressure-relief section, thereby avoiding that the pressure-relief section is projected towards the open air and damages the wind turbine or workers.

According to another preferred embodiment of the invention, the pressure-relief section is a panel, such as a wall, a door, a hatch or a plate.

According to another embodiment of the invention, the housing further comprises a duct, wherein the pressure-relief section is located at an end of the duct. The duct can be a sealed channel placed on the structure of the housing to provide a controlled direction for guiding the expanding gas.

The housing is designed with one or a plurality of pressure-relief sections in strategic positions to let out pressure if a failure or explosion occur. Such pressure-relief sections are located away from the main load carrying structure e.g., foundation, tower, platform, and nacelle. If a leak is detected, the electrolytic unit shuts down, as well as any equipment that may ignite a leaking gas, e.g., electrical components. If a leak or even an explosion is detected, the turbine shuts down, and the rotor is yawed away from the location where the leak is detected.

The material of the pressure-relief section can be chosen in such a way that it absorbs the energy of the explosion and deforms.

According to another embodiment of the invention, the housing further comprises a pressure-resistant section configured to resist blasts, explosions and/or pressures above the predetermined pressure. The pressure-resistant section can be the section facing the tower to prevent that the explosion breaks the pressure-resistant section and projects the broken parts towards the tower.

According to another embodiment of the invention, the housing is painted with fire-proof paint. This is a measure to reduce the risk of a fire propagating through the electrolytic unit and to other components close to the housing. The fire-proof paint also reduces the heat radiation from the housing to the neighboring wind turbine components, further protecting them.

According to another embodiment of the invention, the housing comprises a plurality of pressure-relief sections. The plurality of pressure-relief sections can be distributed strategically to minimize the damage to the wind turbine in case of an explosion.

In the case of a plurality of pressure-relief sections, the explosion might only trigger and open one of the pressure-relief sections, because as soon as the pressure is released through one of the pressure-relief sections, the pressure greatly decreases inside the housing.

According to another embodiment of the invention, the tower comprises shielding means for protecting the tower in case of debris caused by an explosion. The shielding means can be a layer of protective material arranged around the tower in proximity of the electrolytic unit.

According to another embodiment of the invention, the pressure-relief section is made of an anti-splintering material, such as copper. An explosion will deform the pressure-relief section, thereby resulting in an opening in the housing through which the pressure can be relieved, but will not splinter the pressure-relief section, thereby avoiding projectiles of the pressure-relief section from flying and injuring workers or damaging equipment.

Yet another aspect of embodiments of the invention relates to a method of relieving the pressure of an explosion in a housing of an electrolytic unit of a wind turbine by conducting the pressure released by the explosion through the pressure-relief section of the housing.

BRIEF DESCRIPTION

Some of the embodiments will be described in detail, with reference to the following figures, wherein like designations denote like members, wherein:

FIG. 6 shows a nacelle comprising a plurality of pressure-relief sections.

DETAILED DESCRIPTION

Figure 1:
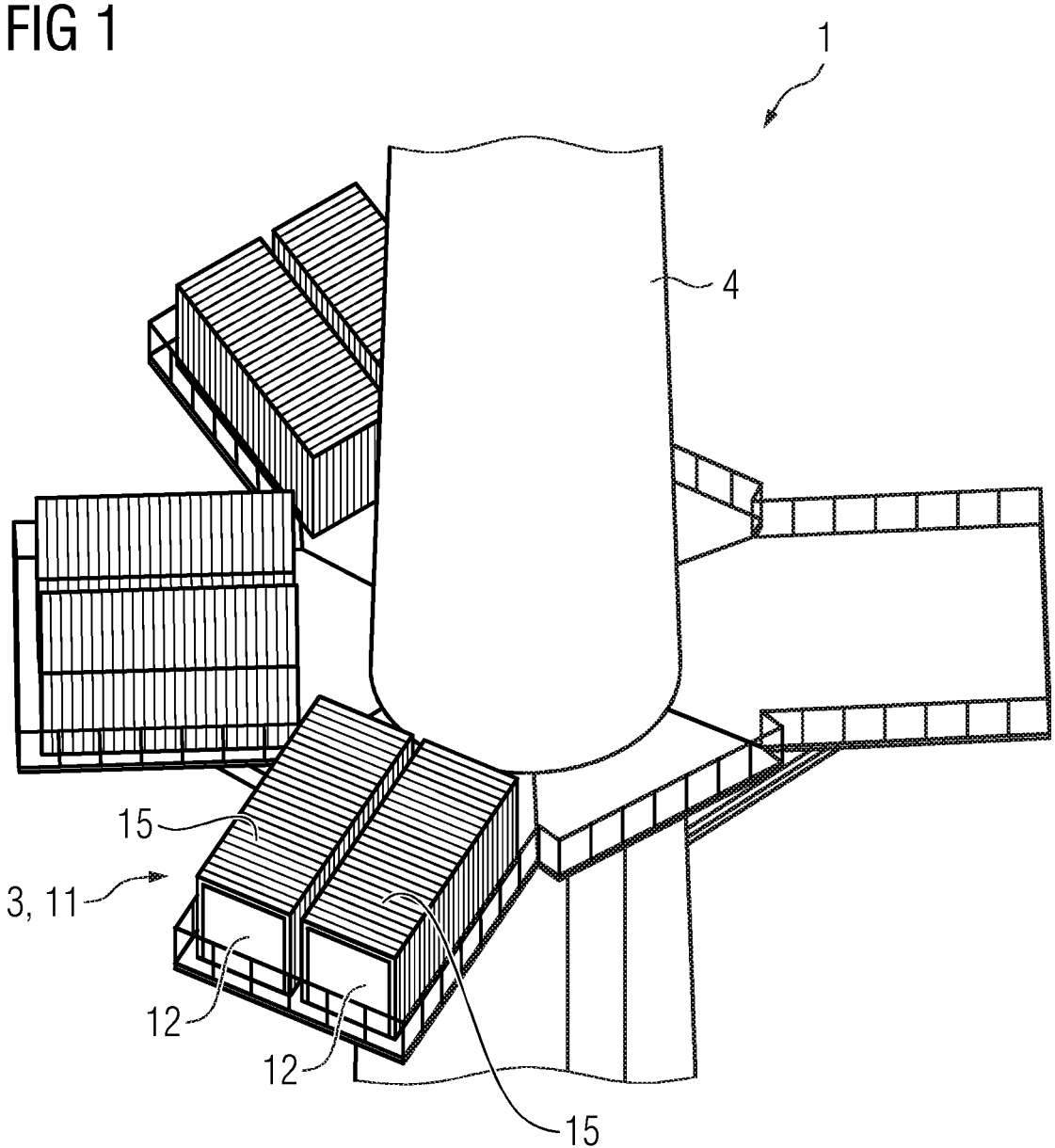
FIG. 1 shows an electrolytic unit housing comprising a pressure-relief section and a pressure-resistant section.

FIG. 1 shows a plurality of containers arranged on an electrolytic unit platform of a wind turbine 1. Two of the containers are the housing 11 of two electrolytic units 3 and are equipped with a pressure-relief section 12 as an outer wall of the container and a pressure-resistant section 15 as the rest of the walls of the container. The pressure-relief section 12 is located in the radially outer region of the housing 11 in relation to the tower's longitudinal axis. The rest of the housing is the pressure-resistant section 15.

In case of an explosion, the expanding gas will be conducted through the pressure-relief section 12, thereby protecting the tower 4 and the nearby containers, as well as workers which might be on the electrolytic unit platform.

The walls of the pressure-relief section 12 can be attached with releasable retainers, such as hinges or bolts designed only to withstand a certain pressure before breaking, to the rest of the container, so that they open with ease from the rest of the container in case of an explosion.

Figure 2:
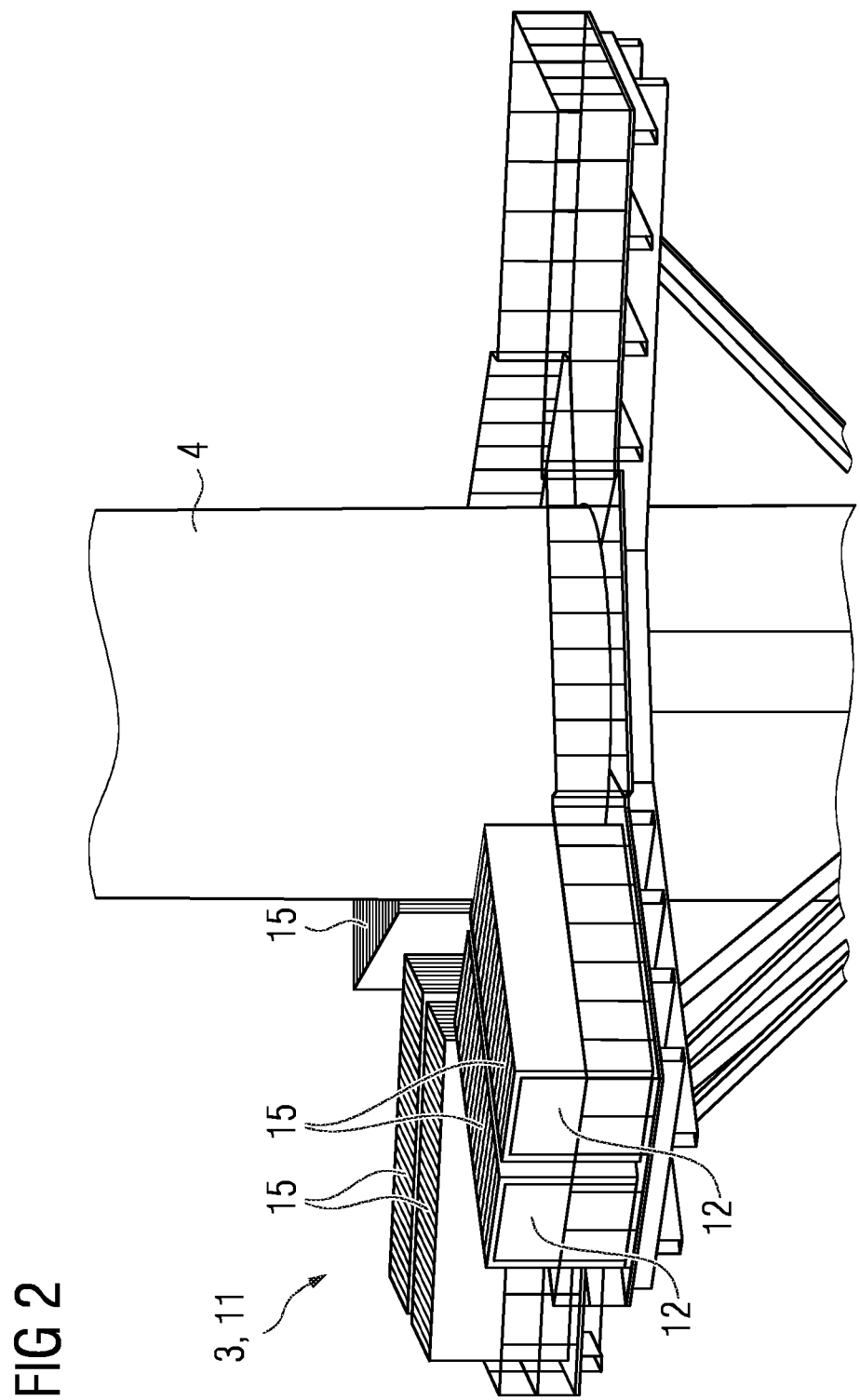
FIG. 2 shows another electrolytic unit housing comprising a pressure-relief section and a pressure-resistant section.

FIG. 2 shows a plurality of containers arranged on an electrolytic unit platform of a wind turbine 1. In contrast to FIG. 1, in FIG. 2 the side walls of the container are also pressure-relief sections 12 designed to open when the pressure exceeds the predetermined pressure. This enables a bigger pressure relief area.

Figure 3:
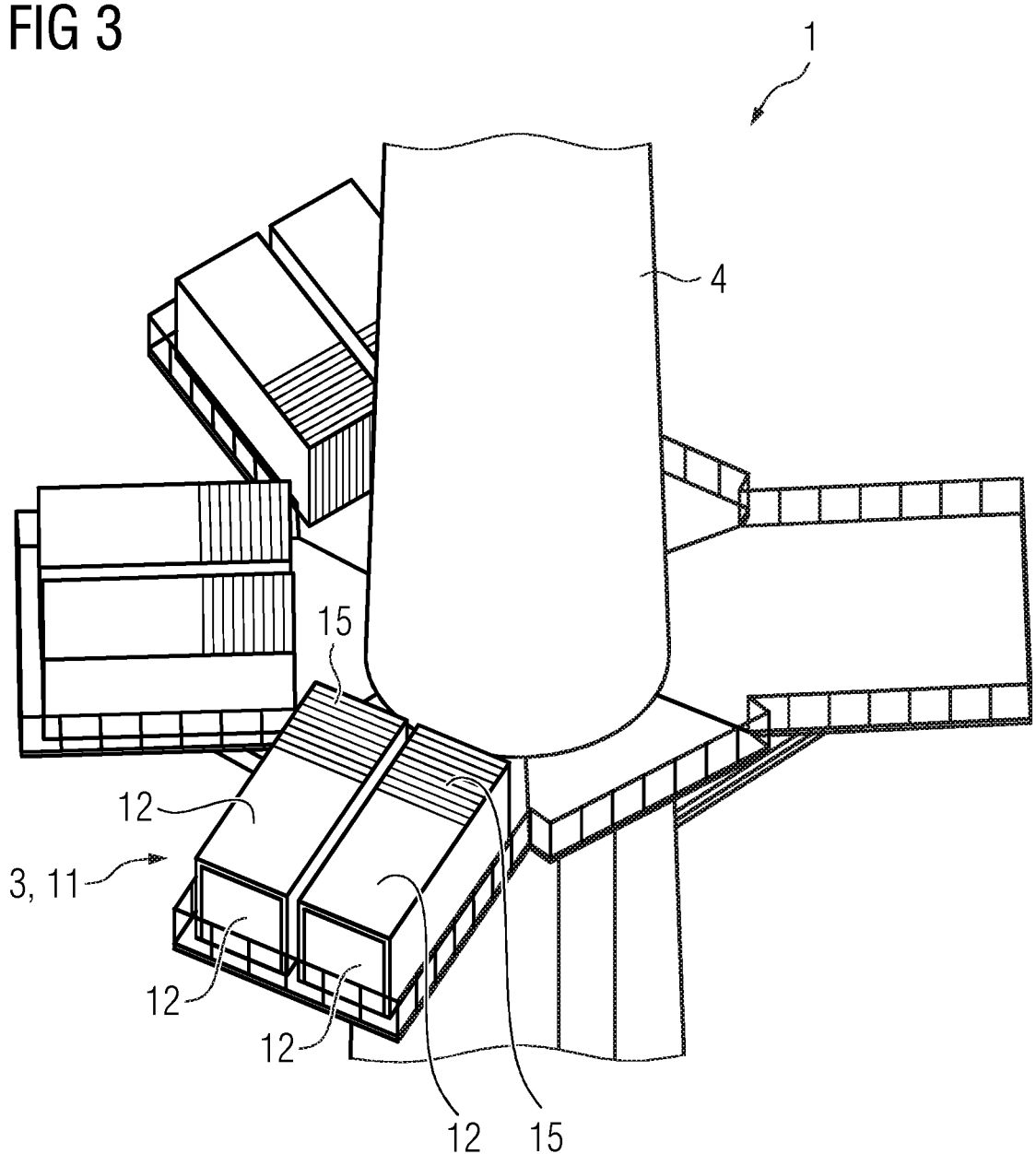
FIG. 3 shows another electrolytic unit housing comprising a pressure-relief section and a pressure-resistant section.

FIG. 3 shows a plurality of containers arranged on an electrolytic unit platform of a wind turbine 1. In contrast to FIG. 2, in FIG. 3 a part of the top wall of the container is also a pressure-relief sections 12 designed to open when the pressure exceeds the predetermined pressure. This enables a bigger pressure relief area.

Figure 4:
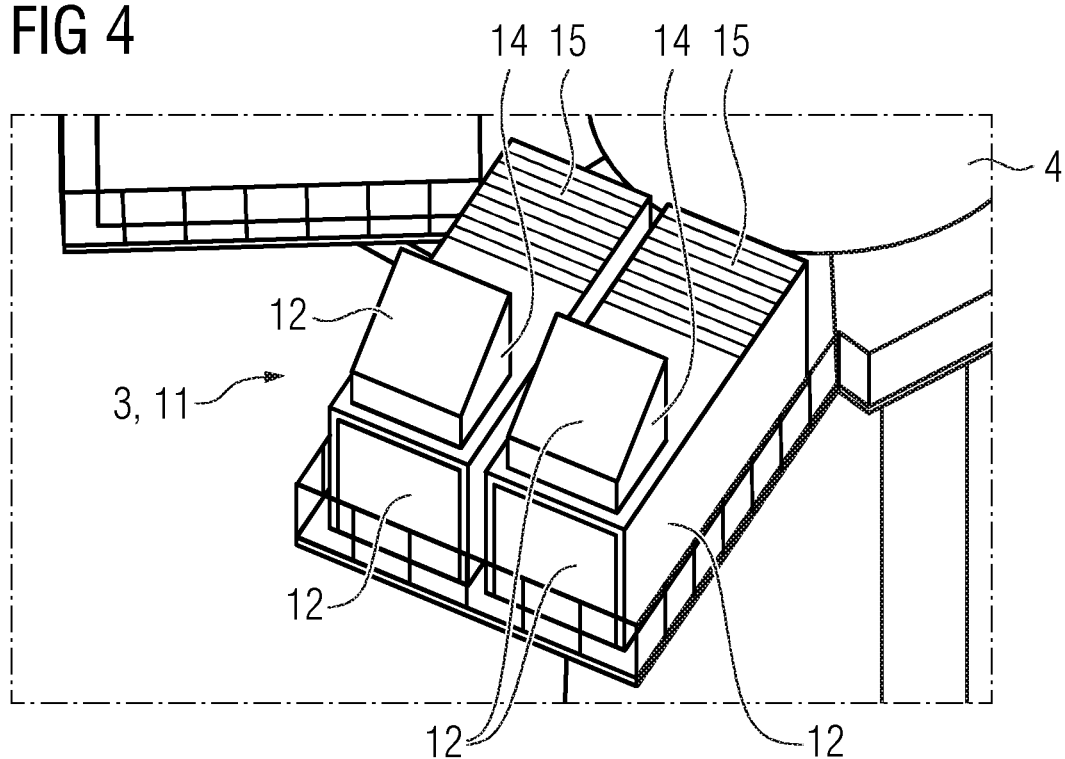
FIG. 4 shows another electrolytic unit housing comprising a pressure-relief section and a pressure-resistant section located at an end of the duct.

FIG. 4 shows a plurality of containers arranged on an electrolytic unit platform of a wind turbine 1. In contrast to FIG. 2, in FIG. 4 the housing further comprising a pressure-relief section 12 located at the end of a duct 14. This allows to guide the explosion away from the tower 4 in the direction of the duct 14. The pressure-relief section 12 located at the end of a duct 14 can be arranged at a specific angle to further guide the explosion away from the tower 4.

Figure 5:
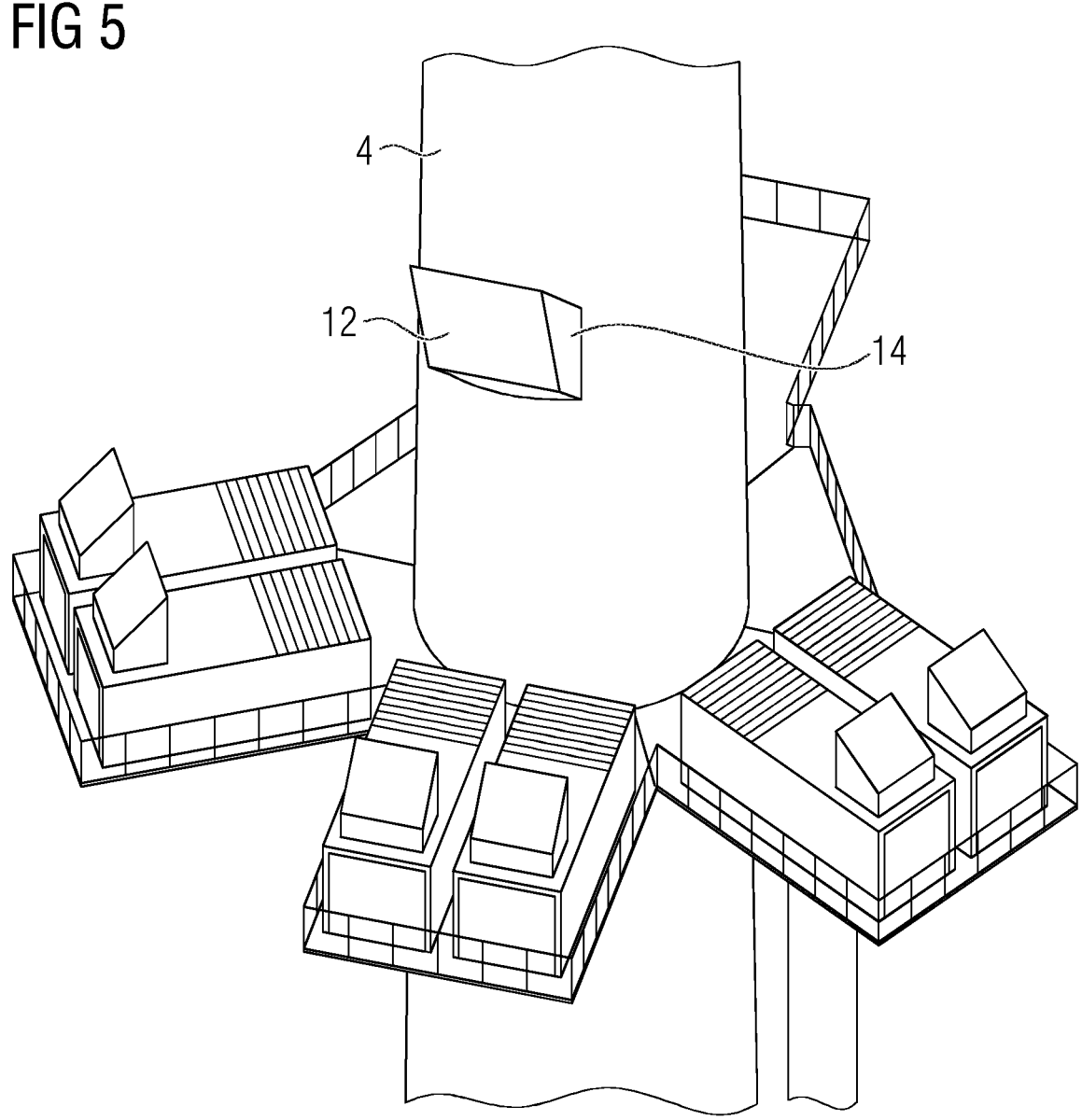
FIG. 5 shows a similar embodiment as shown in FIG. 4, with a pressure-relief section at the tower.

FIG. 5 shows a similar embodiment as shown in FIG. 4, with a pressure-relief section 12 at the tower 4. This measure is helpful for the case when the hydrogen is transported and/or stored within the tower 4, to mitigate the damage of a blast caused by a buildup of hydrogen leak in the tower 4. This can be for example the case when the electrolytic unit 3 is arranged inside or in proximity of the nacelle 4.

The pressure-relief section 12 at the tower 4 can be arranged for example as a duct 14 or as a blast door.

FIG. 6 shows a nacelle 6 comprising a plurality of pressure-relief sections 12. This measure is helpful for the case when the hydrogen is transported and/or stored within the nacelle 6, to mitigate the damage of a blast caused by a buildup of hydrogen leak in the nacelle 6. This can be for example the case when the electrolytic unit 3 is arranged inside or in proximity of the nacelle 6.

The pressure-relief section 12 at the nacelle 6 can be arranged for example as a duct 14 or as a blast door.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

1 Wind turbine
2 Generator
3 Electrolytic unit
4 Tower
5 Base
6 Nacelle
11 Housing
12 Pressure-relief section
14 Duct
15 Pressure-resistant section

The invention claimed is:

1. A wind turbine comprising:
a generator,
a base,
a nacelle,
a tower having a first end mounted to the base and a second end supporting the nacelle, and
an electrolytic unit electrically powered by the generator to produce hydrogen from an input fluid,
wherein the electrolytic unit is electrically coupled to the generator by an electric connection,
wherein the electrolytic unit is comprised in a housing,
wherein the housing comprises a radially inner region and a radially outer region, relative to a longitudinal axis of the tower,
wherein the housing comprises a pressure-relief section configured to detach from the housing in response to an explosion inside the housing or the pressure inside the housing exceeding a predetermined pressure,
wherein the pressure-relief section is located in the radially outer region of the housing, and
wherein the housing further comprises a duct, wherein the pressure-relief section is located at an end of the duct.

2. The wind turbine according to claim 1, wherein the pressure-relief section is located on top of the radially outer region of the housing.

3. The wind turbine according to claim 1, wherein the housing further comprises a releasable retainer for holding the pressure-relief section attached to the housing, the releasable retainer comprising pressure-sensitive means configured to release the retainer in response to an explosion or the pressure inside the housing exceeding the predetermined pressure.

4. The wind turbine according to claim 3, wherein the releasable retainer is configured to be held in the housing by gravity.

5. The wind turbine according to claim 3, wherein the releasable retainer is glued to the housing.

6. The wind turbine according to claim 3, wherein the releasable retainer comprises a hinge.

7. The wind turbine according to claim 1, wherein the pressure-relief section comprises a panel, a wall, a door, a hatch or a plate.

8. The wind turbine according to claim 1, wherein the pressure-relief section is made at least in part of an anti-splintering material.

9. The wind turbine according to claim 8, wherein the anti-splintering material comprises copper.

10. The wind turbine according to claim 1, wherein the housing further comprises a pressure-resistant section configured to resist blasts, explosions or pressures above the predetermined pressure.

11. The wind turbine according to claim 1, wherein the housing is painted with fire-proof paint.

12. The wind turbine according to claim 1, wherein the housing comprises a plurality of pressure-relief sections.

13. The wind turbine according to claim 1, wherein the tower comprises shielding means for protecting the tower in case of debris caused by an explosion.

14. The wind turbine according to claim 1, wherein the pressure-relief section is arranged at the end of the duct at a specific angle to guide the explosion away from the tower.

15. The wind turbine according to claim 1, further comprising a second pressure-relief section located at the tower.

16. A wind turbine according to claim 15, wherein the at least one pressure-relief section comprises a pressure-relief section located at the tower.

17. A wind turbine according to claim 15, wherein the at least one pressure-relief section comprises a pressure-relief section located at the nacelle.

18. A wind turbine according to claim 15, wherein the at least one pressure-relief section comprises a pressure-relief section located at the tower and a plurality of pressure-relief section located at the nacelle.

19. A method comprising:
relieving pressure of an explosion in a housing of an electrolytic unit of the wind turbine according to claim 1,
wherein relieving the pressure comprises conducting the pressure of the explosion through the pressure-relief section.

20. A wind turbine comprising:
a generator,
a base,
a nacelle,
a tower having a first end mounted to the base and a second end supporting the nacelle, and
an electrolytic unit electrically powered by the generator to produce hydrogen from an input fluid,
at least one housing, and
at least one pressure-relief section,
wherein the electrolytic unit is electrically coupled to the generator by an electric connection,
wherein the housing comprises a radially inner region and a radially outer region, relative to a longitudinal axis of the tower,
wherein the at least one housing comprises at least one pressure-relief section,
wherein the pressure-relief section is configured to detach from the housing in response to an explosion inside the housing or the pressure inside the housing exceeding a predetermined pressure,
wherein the pressure-relief section is located in the radially outer region of the housing, wherein the housing further comprises a duct, wherein the pressure-relief section is located at an end of the duct.

* * * * *